United States Patent
Pauritsch et al.

(10) Patent No.: US 8,716,987 B2
(45) Date of Patent: May 6, 2014

(54) ELECTRICAL POWER SUPPLY ARRANGEMENT AND USE THEREOF

(75) Inventors: Manfred Pauritsch, Graz (AT); Peter Trattler, Graz (AT)

(73) Assignee: ams AG, Unterpremstätten (AT)

( * ) Notice: Subject to any disclaimer, the term of this patent is extended or adjusted under 35 U.S.C. 154(b) by 1048 days.

(21) Appl. No.: 11/988,124

(22) PCT Filed: Jun. 21, 2006

(86) PCT No.: PCT/EP2006/005972
§ 371 (c)(1),
(2), (4) Date: Mar. 12, 2009

(87) PCT Pub. No.: WO2007/000272
PCT Pub. Date: Jan. 4, 2007

(65) Prior Publication Data
US 2009/0167260 A1 Jul. 2, 2009

(30) Foreign Application Priority Data

Jun. 28, 2005 (DE) .......................... 10 2005 030 123

(51) Int. Cl.
*H02M 3/156* (2006.01)
*H02M 3/07* (2006.01)

(52) U.S. Cl.
USPC ............................. 323/266; 323/271; 323/288

(58) Field of Classification Search
USPC ............ 323/266, 268, 271, 225, 288; 363/59, 363/60; 307/109, 110
See application file for complete search history.

(56) References Cited

U.S. PATENT DOCUMENTS

| | | | | |
|---|---|---|---|---|
| 4,688,162 A | * | 8/1987 | Mutoh et al. | 363/80 |
| 5,132,606 A | * | 7/1992 | Herbert | 323/266 |
| 5,734,205 A | * | 3/1998 | Okamura et al. | 307/110 |
| 5,814,976 A | * | 9/1998 | Allison | 323/224 |
| 5,877,614 A | * | 3/1999 | Huber | 323/282 |
| 6,043,610 A | * | 3/2000 | Buell | 315/169.3 |
| 6,075,331 A | * | 6/2000 | Ando et al. | 318/376 |

(Continued)

FOREIGN PATENT DOCUMENTS

| | | |
|---|---|---|
| DE | 199 21 146 | 10/2000 |
| DE | 103 21 930 | 12/2003 |

(Continued)

OTHER PUBLICATIONS

Anonymous, "Charge-pump and Step-up DC-DC Converter Solutions for Powering White LEDs in Series of Parallel Connections", Apr. 23, 2002, www.maxim-ic.com/appnotes.cfm/appnote_number/1037/CMP/WP-33>.

*Primary Examiner* — Gary L Laxton
(74) *Attorney, Agent, or Firm* — McDermott Will & Emery LLP

(57) ABSTRACT

A power supply arrangement is specified in which a capacitor with a low internal resistance, in particular a supercap (3), is connected via a means for charging (4) to an input (1) and via a load current regulator (9) to a connecting means (7) for an electrical load (8). Together with a feedback path, a control loop is formed for the load current through the electrical load (8). It is therefore possible to allow flash operation in applications such as mobile telephones with rechargeable batteries with a high internal resistance, with provision for high energy utilization from the capacitor, with controlled discharging with a regulated current.

19 Claims, 5 Drawing Sheets

(56) References Cited

U.S. PATENT DOCUMENTS

| | | | |
|---|---|---|---|
| 6,094,036 A * | 7/2000 | Rampold | 323/266 |
| 6,147,888 A * | 11/2000 | Rivet | 363/143 |
| 6,304,007 B1 * | 10/2001 | Yu | 307/110 |
| 6,310,789 B1 * | 10/2001 | Nebrigic et al. | 363/60 |
| 6,798,177 B1 * | 9/2004 | Liu et al. | 323/222 |
| 6,844,762 B2 * | 1/2005 | Sanchez | 327/157 |
| 6,850,044 B2 | 2/2005 | Hansen et al. | |
| 6,870,328 B2 * | 3/2005 | Tanabe et al. | 315/291 |
| 7,242,168 B2 * | 7/2007 | Muller et al. | 323/222 |
| 7,266,001 B1 * | 9/2007 | Notohamiprodjo et al. | 363/59 |
| 7,579,818 B2 * | 8/2009 | Ball et al. | 323/284 |
| 7,777,459 B2 * | 8/2010 | Williams | 323/266 |
| 7,907,430 B2 * | 3/2011 | Kularatna et al. | 363/59 |
| 2001/0033503 A1 | 10/2001 | Hamp et al. | |
| 2004/0004462 A1 | 1/2004 | Bean | |

FOREIGN PATENT DOCUMENTS

| | | |
|---|---|---|
| EP | 0 798 840 | 3/1997 |
| EP | 0 798 840 | 10/1997 |
| WO | WO 02/071815 | 9/2002 |
| WO | WO 03/056684 | 7/2003 |
| WO | WO 2004/082098 | 9/2004 |
| WO | WO 2006/081613 | 8/2006 |

* cited by examiner

ELECTRICAL POWER SUPPLY ARRANGEMENT AND USE THEREOF

RELATED APPLICATIONS

This is a U.S. national stage of application No. PCT/DE2006/005972, filed on 21 Jun. 2006.

This patent application claims the priority of German patent application no. 10 2005 030 123.1 filed Jun. 28, 2005, the disclosure content of which is hereby incorporated by reference.

FIELD OF THE INVENTION

The present invention relates to a power supply arrangement and its use in a mobile radio.

BACKGROUND OF THE INVENTION

A rechargeable battery is normally used to supply power in mobile radios. Such rechargeable batteries have an operating voltage of, for example, 3.3 volts to 4.2 volts, depending on their state of charge. In addition, rechargeable batteries such as these, such as lithium-ion rechargeable batteries, metal-hydride rechargeable batteries or nickel-cadmium rechargeable batteries, have a relatively high internal resistance, typically of around 200 milliohms.

The trend for integration of digital camera functionality in mobile telephones is leading to the requirement to also integrate high-power flash appliances in mobile radios.

By way of example, it would be possible to fit so-called xenon flash lamps in order to manage with the given, maximum current driver capability of the rechargeable battery. However, these have relatively high operating voltages of, for example 300 volts, which require additional protective measures against live parts being touched, because these voltages considerably exceed the low-voltage protection limits as specified in many countries. This would be associated with a relatively high degree of complexity.

Light-emitting diodes may likewise have a flash function without having to exceed the low voltage protection limit of 60 volts to do so. However, one problem in this case is that light-emitting diodes such as these require relatively high currents of up to 5 amperes as a peak load with a forward voltage of 5 volts in order to achieve adequate flash brightness. However, the types of rechargeable battery mentioned above cannot provide such high currents because of their relatively high internal resistance, even just for a short time period, since the collapse of the voltage would cause the mobile telephone to reset itself.

Because of the limited energy content of rechargeable batteries of a predetermined weight and volume, it is desirable to achieve high load efficiencies in mobile appliances.

SUMMARY OF THE INVENTION

One object of the present invention is to specify a power supply arrangement which is suitable for use in mobile radios and for driving light-emitting diodes with a flash functionality.

This and other objects are attained in accordance with one aspect of the present invention directed to a power supply arrangement that has an input for connecting a voltage source. A capacitor with a low internal resistance is coupled via a means for charging the capacitor to the input of the power supply arrangement. A load current regulator couples the capacitor to a means for connecting an electrical load. The load current regulator has a feedback input, to which the means for connecting the electrical load is coupled via a feedback path and a means for load current detection.

The capacitor is used as a temporary energy store in order to reduce the peak current which the electrical load requires and which would otherwise have to be provided by the battery itself. By way of example, this avoids a mobile radio in which the power supply arrangement is accommodated being switched off automatically as a result of the battery voltage collapsing.

During a charging phase of the capacitor, this capacitor is charged with a low current, for example of half an ampere for a specific time period, for example for one second, from the voltage source to its rated voltage.

In a subsequent discharge phase, the capacitor is not discharged via a simple resistance to the electrical load but, instead, controlled discharging takes place, with a regulator current The load current regulator is provided for this purpose, in which the load current is regulated in a closed control loop by means of the load current regulator, as a function of the actual load current, which can be measured by the means for load current detection.

The input for connecting a voltage source is designed in particular for connection to a rechargeable battery which has a relatively high internal resistance.

The described power supply arrangement is preferably designed for use in mobile radios, in particular for driving one or more light-emitting diodes as the electrical load.

The internal resistance of the capacitor is preferably less than the internal resistance of the voltage source.

It is particularly preferable for the internal resistance of the capacitor to be less than 50 milliohms.

The means for connecting an electrical load is preferably in the form of a means for connecting a light-emitting diode, in particular a flash light-emitting diode, (flash LED).

In one embodiment of the invention, a light-emitting diode is connected to the means for connecting an electrical load.

The capacitor is preferably a so-called supercap.

The capacitance of the capacitor is preferably in a range from 0.1 Farad to 10 Farad. The capacitance range is particularly preferably between 1 and 2 Farads.

By way of example, the supercap has a rated voltage of 2.5 volts, 4.5 volts or 5 volts.

The means for load current detection preferably comprises a current source. Because of its position in the circuit, the current source can also be regarded as a current sink. In the simplest case, by way of example, a resistor is connected in series with the electrical load, with the voltage that is dropped across the resistor being measured. If this voltage is known and the resistance is known a priori, the actual load current can be deduced. The current source may in this case be connected in a joint current path either between the load current regulator and the electrical load, or between the electrical load and a reference-ground potential connection.

The means for charging the capacitor preferably comprises a charge pump. At its output, the charge pump produces a voltage which may be higher than the voltage at its input. In this case, the charge pump normally operates with one or more small capacitors. It is therefore possible to use a supercap whose voltage in the charged state is higher than the voltage of a battery connected to the input of the arrangement. The energy content of the capacitor can thus be increased. Furthermore, the capacitor can be charged independently of the state of charge of the battery.

The load current regulator preferably comprises a means for load current limiting.

The load current regulator may, for example, be in the form of a DC/DC converter which has a feedback input.

The means for charging the capacitor and the load current regulator may have a jointly used inductance. Only one inductance is therefore required for the entire power supply arrangement and is used both for charging the capacitance as part of the means for charging and in a discharge mode as part of the load current regulator. Particularly when the circuit is designed using integrated circuit technology, this double use of the inductance saves a considerable amount of area, and therefore costs.

The means for charging the capacitor preferably comprises a Buck converter. In this case, there is no need to connect a charge pump upstream of the Buck converter. Buck converters are also referred to as step-down converters or step-down controllers.

The load current regulator preferably comprises a boost converter. Boost converters such as these are also referred to as step-up converters or step-up controllers.

The Buck converter and the boost converter in the load current regulator are particularly preferably combined to form one unit. In particular, this advantageously allows multiple use of individual components such as an inductance.

In one preferred development of the proposed principle, a bypass path which can be switched on and off is provided and couples the means for charging the capacitor to the means for connecting the electrical load. This makes it possible to bridge the capacitor. This is used in particular to operate an electrical load such as a light-emitting diode in a bypass mode not as a flash lamp but in a continuous mode, for example with a torch function or as a video lamp.

In a charging mode, the capacitor can be coupled in parallel to the voltage source via the means for charging. In a discharge mode, the capacitor is preferably connected in parallel to a current path via the load current regulator, with this current path comprising the electrical load or at least the means for connecting the electrical load.

Alternatively, in the discharge mode, the capacitor can be connected in series with the voltage source. The latter has the advantage of a higher output voltage during discharging, while a higher peak current can be produced during parallel discharging. The choice of the connection in the discharge mode in this case depends on the application and the characteristic data of the electrical load and of the capacitor.

In one development, the capacitor is connected in series with the voltage source both in the charging mode and in the discharge mode. A boost converter may be used in the charging mode. One advantage of this development is that the arrangement can be designed without those switches which are required to switch from the parallel circuit to the series circuit of the capacitor and the voltage source.

The described power supply arrangement is particularly preferably designed using integrated circuit technology.

It is particularly advantageous to use the power supply arrangement in a mobile radio for coupling an electrical load, which is in the form of a flash light-emitting diode, to a voltage source in the form of a rechargeable battery.

BRIEF DESCRIPTION OF THE DRAWINGS

The invention will be explained in more detail in the following text using a plurality of exemplary embodiments and with reference to the drawings, in which.

DETAILED DESCRIPTION OF THE DRAWINGS

Figure 1:
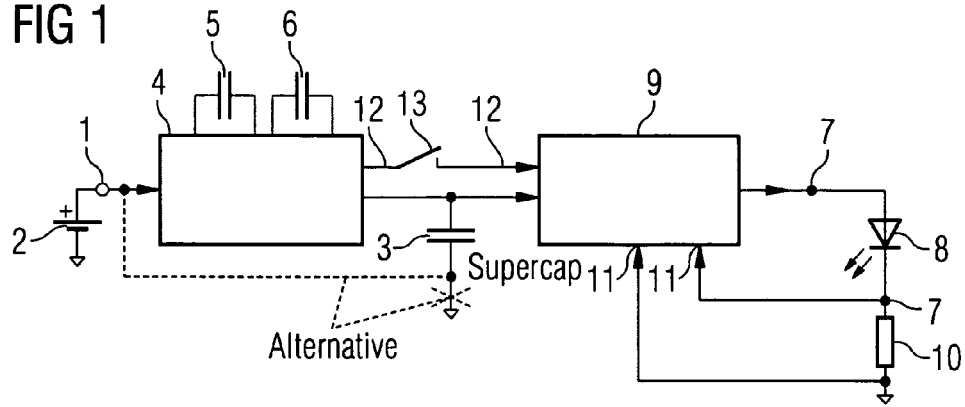
FIG. 1 shows one exemplary embodiment of a power supply arrangement based on the invention.

FIG. 1 shows one exemplary embodiment of a power supply arrangement based on the invention. An input 1 of the power supply arrangement is designed for connecting a voltage source. In the present case, a battery 2 is connected as the voltage source to the input 1. Furthermore, a capacitor 3 is provided, which has a low internal resistance of, by way of example, 50 mΩ. This capacitor 3 is in the form of a so-called supercap. A means 4 for charging the capacitor is connected between the input 1 and the capacitor 3, and in the present case is in the form of a charge pump comprising two capacitors 5, 6 which makes it possible for the charge pump to produce a higher voltage at its output than the battery voltage at the input 1. A light-emitting diode 8 is connected to a means 7 for connecting an electrical load, the means having two terminals. The capacitor 3 is connected to the means 7 for connecting an electrical load via a load current regulator 9. The load current regulator 9 has a means for current limiting. Furthermore, a means 10 for load current detection is connected to the means 7 for connecting an electrical load. The means 10 for load current detection has two terminals, which are connected to a feedback input 11 of the load current regulator 9 in order to form a feedback path. A control loop is therefore formed to regulate the load current through the diode 8. The diode 8 is connected in series within a common current path with the means 10, which in the present case is in the form of a resistor, for the load current detection.

A bypass path 12 is provided for bridging the capacitor 3 and has a switch 13. The bypass path 12 comprising switch 13 connects, in a manner that is switchable on and off, an output of the charge pump to an input of the load current regulator 9.

The method of operation of the circuit shown in FIG. 1 is characterized by two phases. In a first phase, specifically the charging phase, the capacitor 3 is charged by means of the battery 2 and the charge pump, preferably to its maximum voltage. In a second phase, the discharge phase, the load current regulator 9 is used to discharge the capacitor 3 quickly and to transfer its energy content to the flash light-emitting diode 8. In the discharge phase, the charge pump can still transfer energy to the capacitor 3, in order to lengthen the duration of the flash.

The capacitor 3 is in the form of a supercap and is accordingly used for temporary storage of electrical energy in the form of charge, in order to reduce the peak current from the battery 2. The peak current from the battery must therefore be limited in order to prevent the application in which the proposed power supply arrangement is embedded, for example a mobile telephone, from being switched off. If the supply voltage collapses, as it would do without the support from the supercap, this would result in the load circuits being disconnected from the battery in a mobile telephone.

While the battery typically has a relatively high internal resistance, for example of 200 mΩ, the internal resistance of the capacitor 3 is very much less, and, for example, is less than or equal to 50 mΩ. The capacitance of the capacitor 3 is preferably between 1 and 2 Farads, with a capacitor rated voltage of 5 volts.

The capacitor 3 is charged from the battery over a relatively long time interval, for example of one second, with a relatively low current, for example of half an ampere. In the discharge mode, that is to say for operation of the flash light-emitting diode 8, a high current for example of up to 5 ampere is passed through the light-emitting diode 8 for a fraction of a second, and produces the flash.

The proposed arrangement is particularly suitable for use in mobile telephones which have a digital camera, because of the advantageous characteristics of the proposed circuit, such as the capability of being implemented at low cost, the need for only one or two small capacitors 5, 6 in the charge pump for charging the supercap 3, and the optional parallel path 12 for operation of the flash light-emitting diode 8 with a torch or video-light function.

One special feature in this case is that the capacitor is discharged in a controlled manner with a regulated current, by virtue of the control loop for the load current regulator 9 together with the means for load current detection 10 and the feedback path. In particular, the load current regulator is advantageously designed such that the electrical load 8 is operated with a constant discharge current.

In one alternative embodiment, the second capacitor 6 can be omitted.

Figure 2:
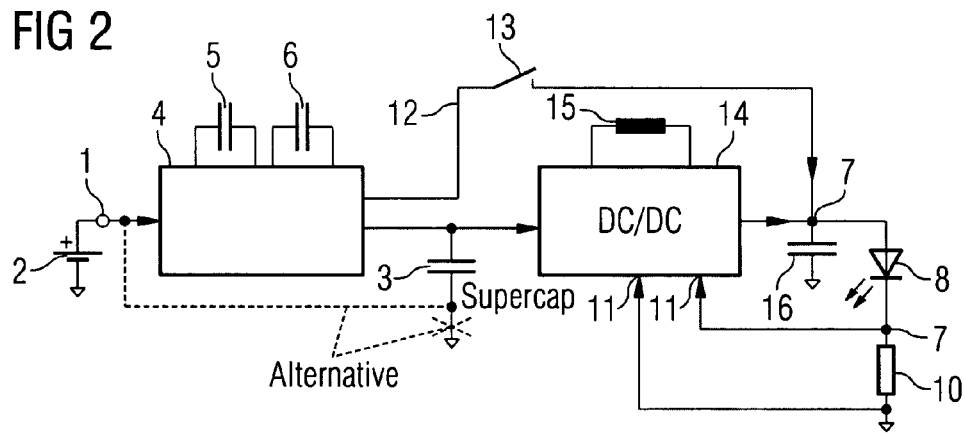
FIG. 2 shows an exemplary development of the circuit shown in FIG. 1.

FIG. 2 shows a development of the circuit shown in FIG. 1, which largely correspond to one another in terms of the components used, their advantageous connection and method of operation, and it will therefore not be described again. Instead of the load current regulator 9, a DC/DC converter 14 comprising an inductance 15 is provided as the load current regulator in FIG. 2. The load current regulator 14 also has a current limiting function. In addition, at the output of the DC/DC converter 14, a supporting capacitance 16 is connected to ground. The bypass path 12 comprising the switch 13 is connected, in the example shown in FIG. 2, from an output of the means for charging the capacitor 4 to that output of the DC/DC converter 14 which is connected to the supporting capacitance 16.

As has already been explained above, the capacitance 3 can be bridged in order to provide a torch or video-light function, in order to avoid unnecessary charging of the capacitor in this case. In this case, the output stage of the means for charging the capacitor, which is preferably in the form of a charge pump, is duplicated, for example with two output driver transistors with a joint drive. The charge pump therefore has two outputs, specifically one which is connected to the capacitor 3 and one which is connected directly to the light-emitting diode 8 when the bypass path 12 is switched on. This path is likewise designed with current limiting.

The circuit shown in FIG. 2 has the following advantages: the use of the energy content of the capacitor 3 in the flash mode is improved. As a result of the improved utilization of the capacitor 3, it is possible to use a capacitor 3 of a smaller size, reducing the costs. A charge pump of very simple design can be used to charge the capacitor and does not require any additional inductance, but only one or two small external capacitors. The circuit is particularly suitable for supercaps with a rated voltage of 4.5 or 5 volts. The bypass path may be provided by just one additional transistor as an additional output stage of the charge pump and a further transistor as a switch 13, and therefore with particularly little additional complexity.

In one alternative embodiment, the supporting capacitance 16 may be omitted.

Figure 3:
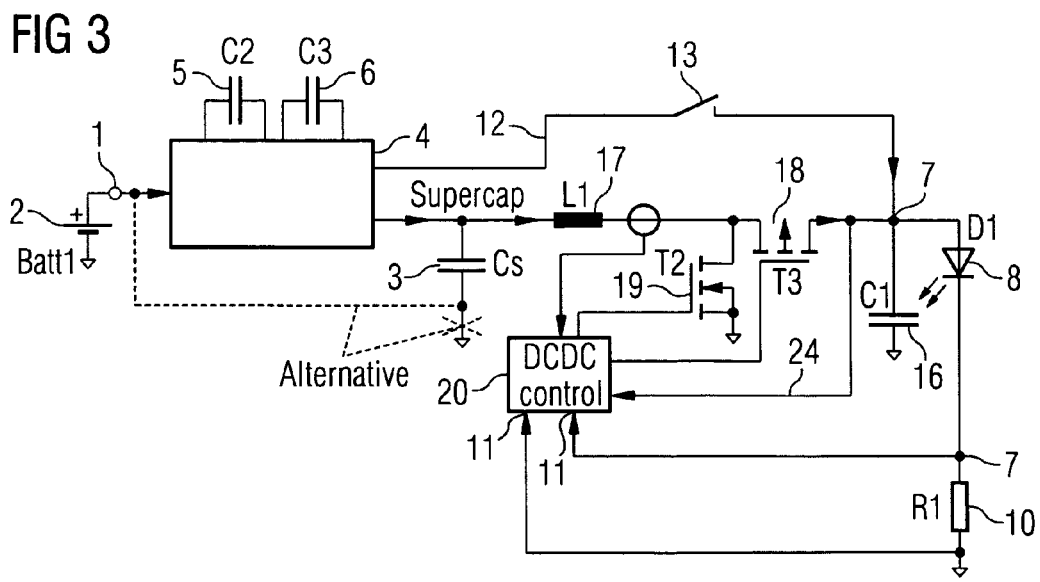
FIG. 3 shows an exemplary development of the circuit shown in FIG. 2.

FIG. 3 shows a development of the circuit shown in FIG. 2 in which the components used and the advantageous function of both circuits largely correspond and which will therefore not be described again at this point.

In addition, in FIG. 3, a DC/DC converter is provided to regulate the load current with the light-emitting diode 8. The DC/DC converter includes coil 17, transistors 18 and 19, and control unit 20. Coil 17 is connected between one connection of the capacitor 3 and a connection of a controlled junction in transistor 18. A further connection of the controlled junction of the transistor 18 is connected to the supporting capacitor 16 and the light-emitting diode 8. Transistor 19 connects the output connection of the inductance 17 to a reference-ground potential connection. Control unit 20 is provided for controlling the transistors 18, 19. Outputs of the control unit 20 are connected to control connections of the two transistors 18, 19. Input connections of the control unit 20 are connected to the output connection of the inductance 17 and to both tapping nodes on the resistor 10.

In the case of the circuit shown in FIG. 3, the load current through the light-emitting diode 8 can either be measured by means of the resistor 10, or alternatively by measuring the current through the transistor 18. The average current through the transistor 18 is identical to the average current through the resistor 10. In this case, there is no need for the resistor 10. An additional voltage feedback 24 from the node 7 at a terminal of capacitor 16 guarantees voltage limiting in all conditions, for example when the diode is open circuit. An open circuit diode means, for example, an interruption in the conductor path or a torn-off bonding wire.

Figure 4:
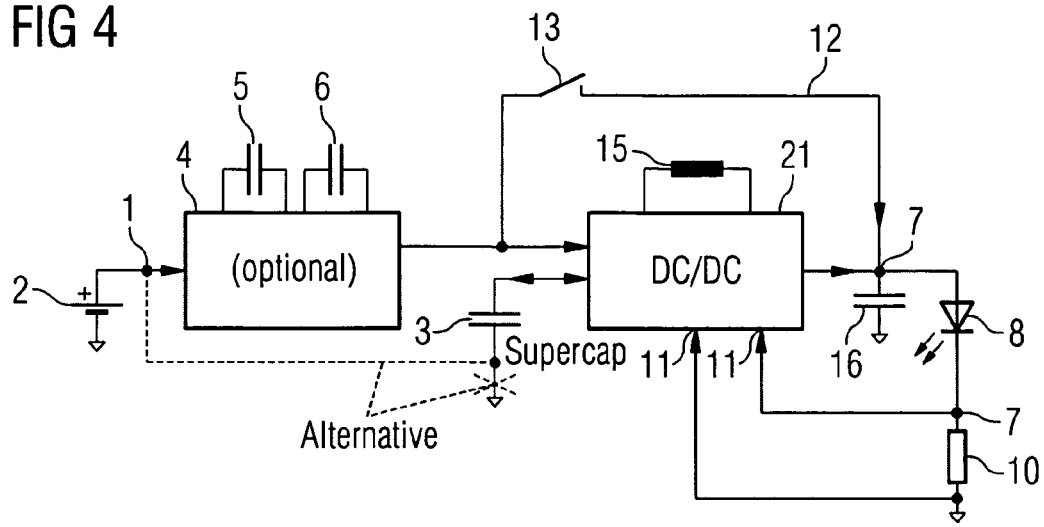
FIG. 4 shows a different exemplary development of the circuit shown in FIG. 1.

With respect to the refinements shown in FIGS. 2 and 3, FIG. 4 shows another development of the circuit shown in FIG. 1. Where the components used and the advantageous circuitry in the circuit shown in FIG. 4 correspond to those in FIG. 1, this description will not be repeated at this point.

In the circuit shown in FIG. 4, the output of the circuit block 4 is connected directly to one input of the DC/DC converter 21, which forms the load current regulator. The capacitor 3 is connected to a further connection of the DC/DC converter 21, but is not directly connected to the circuit block 4. In the circuit shown in FIG. 4, the charge pump may be omitted in alternative embodiments, which means that the input 1 is connected directly to the input of the DC/DC converter 21. The actual means for charging the capacitor is therefore formed by the DC/DC converter 21.

The DC/DC converter 21 is in the form of a so-called Buck converter, in order to charge the capacitor 3 during a charging phase. A boost converter is also integrated in the DC/DC converter 21 for the discharge phase, that is to say the flash phase. The Buck converter and the boost converter in the DC/DC converter 21 advantageously share a joint inductance. Once again, a bypass path 12 is provided in order to provide a torch or video-light mode, and connects the output of the optional charge pump 4 to the light-emitting diode 8 via a switch, with current limiting.

Buck converters are also referred to as step-down converters, and boost converters are referred to as step-up converters. Both DC/DC voltage converts are within the generic group of so-called secondary-clocked switched-mode regulators.

The way in which the step-up converter and the step-down converter in the DC/DC converter 21 shown in FIG. 4 share the joint inductance 15 will be described in detail in the following text using FIG. 5 by way of example, which shows one advantageous refinement of the circuit shown in FIG. 4.

The connection of the coil 17, of the series transistor 18 and of the parallel transistor 19 to one another, to the control unit 20 and to the supporting capacitance 16 corresponds to the circuit shown in FIG. 3, and will therefore not be described again at this point. However, that connection of the coil 17 which is not connected to the transistors 18, 19 is coupled only to the capacitor 3, but not to the input 1 of the arrangement, in the circuit shown in FIG. 5. In fact, a further transistor 22 is provided for this purpose, whose controlled junction connects the output connection of the inductance 17 to the output of the optional charge pump 4.

As can be seen, provision is made not only for the inductance 17 to be a component of the step-down converter and of the step-up converter, but also for duplicated use of the transistor 22. While the transistor 22 is the output transistor of the charge pump 4, it is also used in the DC/DC converter as well. The DC/DC converter is advantageously synchronized with the charge pump for this purpose.

Figure 5:
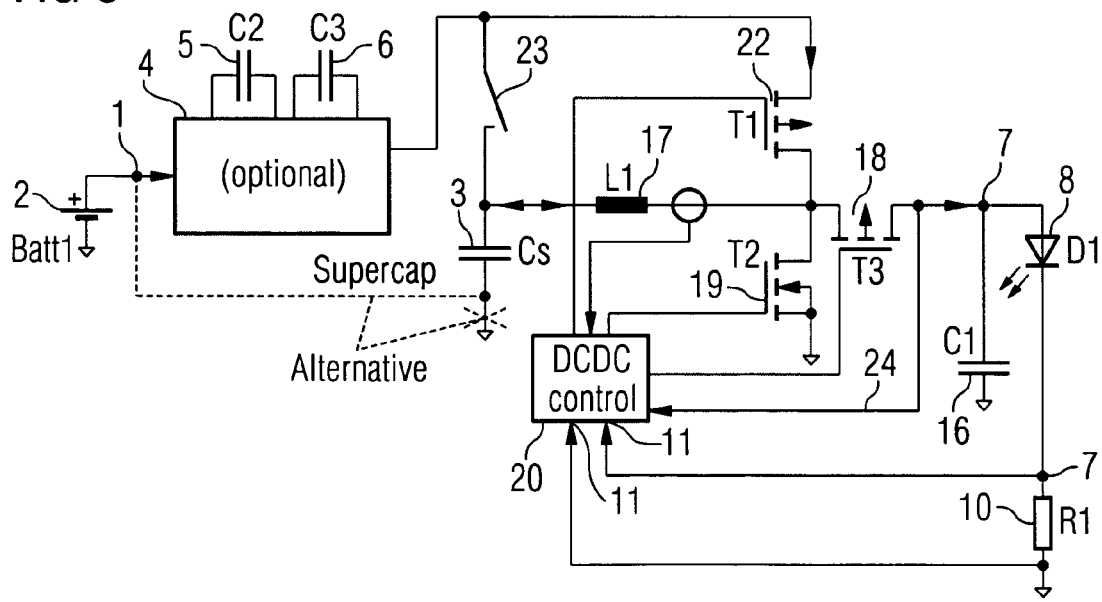
FIG. 5 shows an exemplary development of the circuit shown in FIG. 4.

As shown in FIG. 5, the load current through the diode 8 can be controlled either by the resistor 10 or by measuring the current through the transistor 18, since the mean current through the transistor 18 corresponds to the mean current through the resistor 10.

Alternatively, the resistor 10 may be omitted.

Three different operating modes of the circuit shown in FIG. 5 will be explained in more detail with reference to FIGS. 6 to 8. The circuits in FIGS. 6 to 8 in this case correspond in their design and their advantageous method of operation to the circuit in FIG. 5 and this will not be described again at this point.

Figure 6:
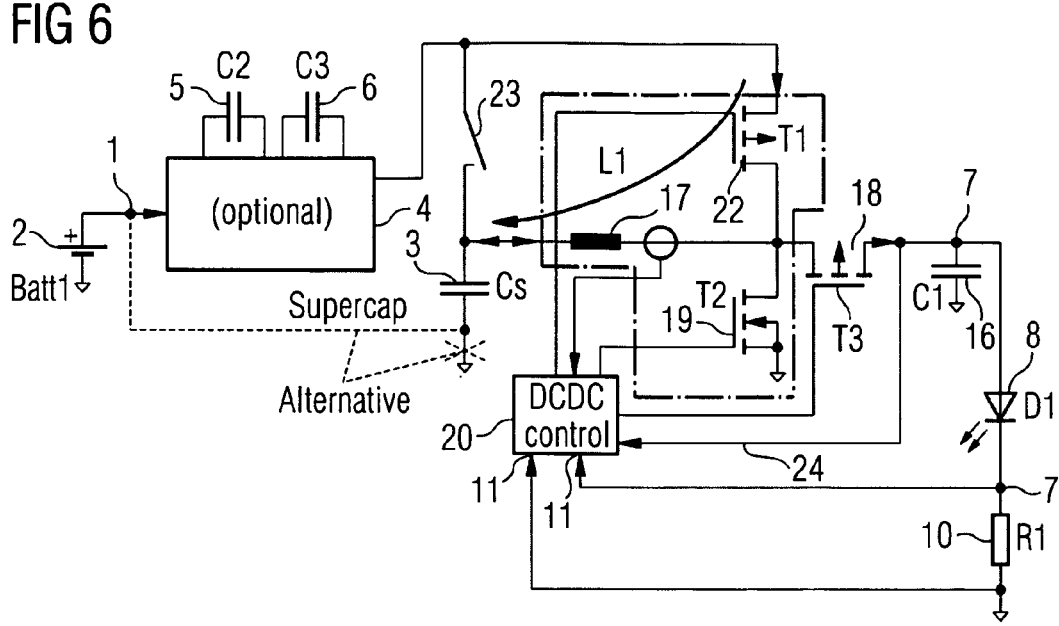
FIG. 6 shows an example of a charging phase in the circuit shown in FIG. 5.

FIG. 6 shows a first operating phase, specifically the charging phase of the capacitor 3. In this case, the DC/DC converter is operated as a step-down converter. The components of the step-down converter in this case are the transistor 22, the inductance 17 and the transistor 19.

Figure 7:
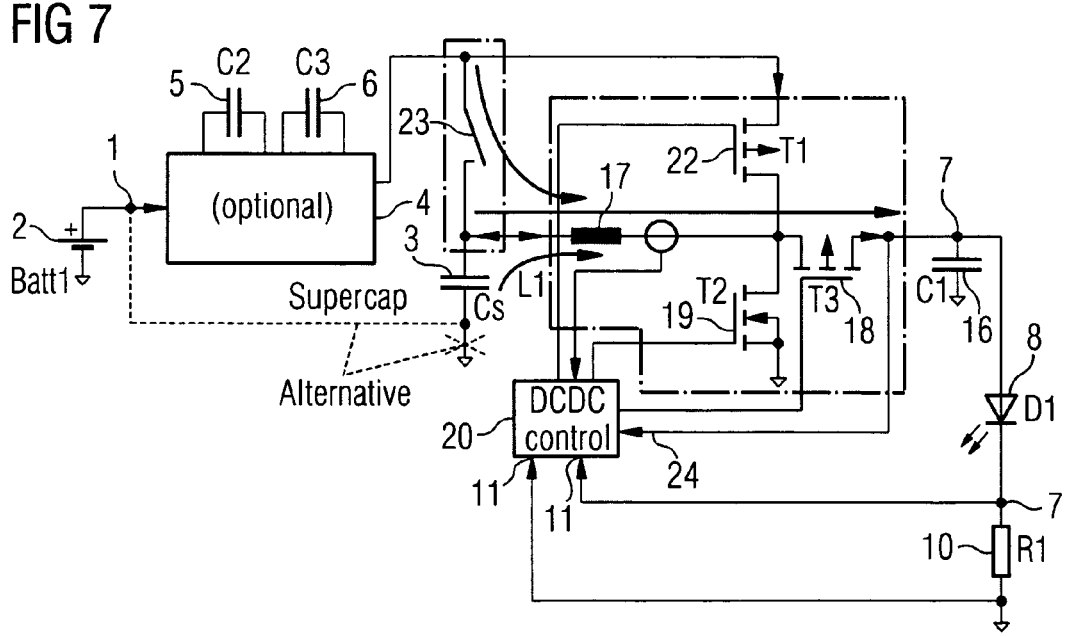
FIG. 7 shows an example of a discharge phase in the circuit shown in FIG. 5.

FIG. 7 shows a second operating phase, specifically the discharge phase. In this case, the load current regulator operates as a step-up converter. The inductance 17, the transistor 19 and the transistor 18 are used for this purpose. The charge pump 4 can still transfer energy to the capacitor 3 by means of a switch 23, in order to lengthen the duration of the flash.

Figure 8:
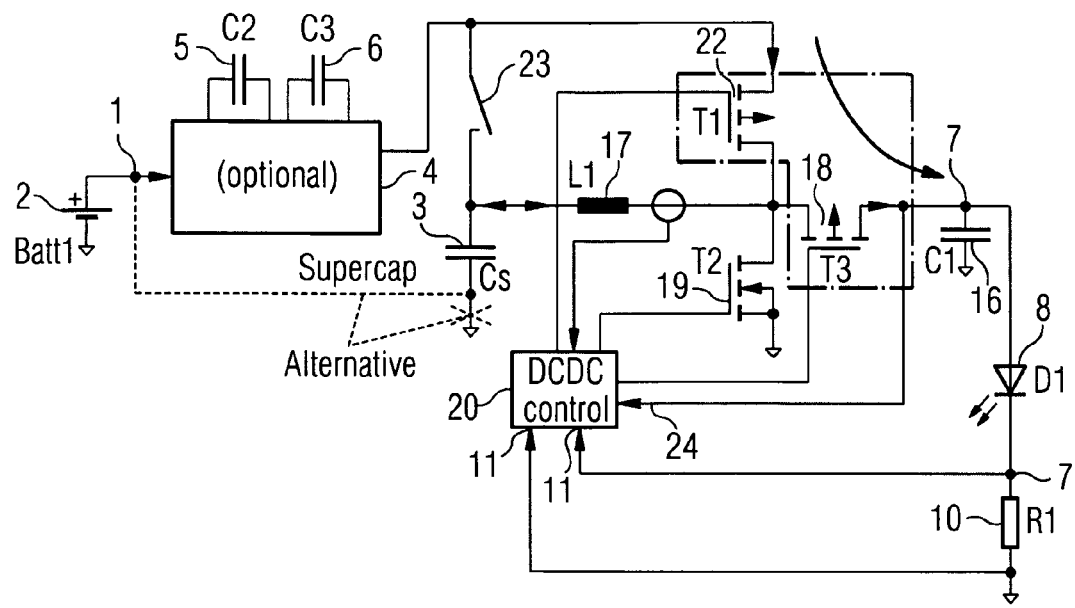
FIG. 8 shows an example of a torch mode with the circuit shown in FIG. 5.
Figure 9:
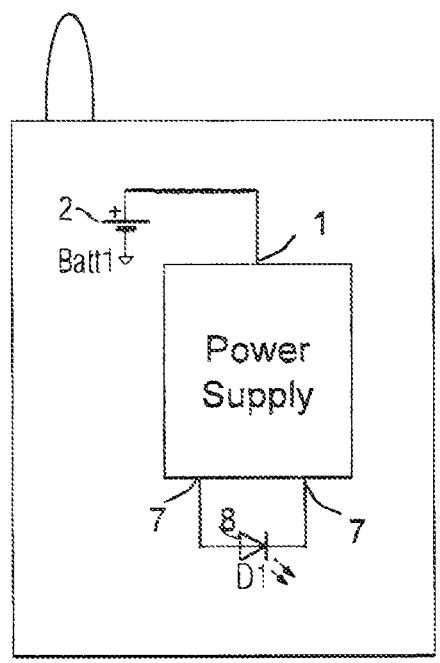
FIG. 9 shows an example of a mobile radio comprising an electrical load.

Finally, FIG. 8 also shows a third operating mode, specifically the operating mode as a torch or video light instead of a flash mode as described in FIGS. 6 and 7. In this case, the output of the charge pump 4 guides the light-emitting diode 8 directly. The transistors 22 and 18 are used for this purpose.

The exemplary embodiments shown in FIGS. 4 to 8 are particularly suitable for supercaps with a rated voltage of 2.5 volts, but can also be used in order to improve the efficiency of the charging phase for supercaps with a rated voltage of 4.5 or 5 volts.

The advantages of the circuits shown in FIGS. 4 to 8 comprise, in particular, the following: the transistor 22 may be used for two functions, specifically an output stage of the charge pump and a switch in the DC/DC converter. A complete step-up converter, step-down converter or bypass mode are made possibly directly from the charge pump, switchably and dynamically, using just two additional transistors 18, 19. The coil 17 is jointly used both as an inductance in the step-up converter and as an inductance in the step-down converter. Overall, the described advantages lead to a minimal chip area, owing to the multiple use of numerous components.

The exemplary embodiments shown in FIGS. 1 to 8 are particularly suitable for use in the following fields of application: in portable appliances such as mobile telephones, high short-term output powers and currents of, for example, 5 ampere can be provided by an LED by means of a supercap with a forward voltage of, for example, 4.5 or 5 volts. This makes it possible to avoid the use of xenon flashes, which require additional complexity because of their high voltages, in mobile telephones. If only medium output powers and currents of, for example, 2 amperes are required by the LED, it is advantageous to use 2.5 volt supercaps. In all cases, the size of the circuit and the required chip area are very small.

The charge pump is designed in particular in the embodiments shown in FIGS. 2 and 3, for charging the capacitor with a current limiting function. In all the described exemplary embodiments, the capacitor is discharged with current limiting through the load current regulator.

In the exemplary embodiments shown in FIGS. 2 and 3, the invention provides for the supercap to be charged by means of a charge pump and to be discharged by means of an inductive DC/DC converter in the flash mode. In this case, the supercap is charged using a charge pump with a current limiting function. The supercap is discharged into the LED using a current-limiting DC/DC converter. Supercaps with low rated voltages can also be used by using a current-limiting step-up converter as the DC/DC converter.

In alternative embodiments of the circuit shown in FIG. 4, the charge pump at the input may be omitted. The DC/DC converter is in the form of a combined step-up and step-down converter, with a step-down converter being used to charge the supercap, and a step-up converter being used to discharge the supercap. Supercaps with a low rated voltage can also be used, by using a current-limited step-up DC/DC converter.

Particularly in the case of the circuit shown in FIG. 5, both the output transistor 22 and the coil 17 can be used more than once for different tasks, as explained depending on the chosen operating mode, see FIGS. 6 to 8. Only three transistors are required for the complete implementation of the load current regulator, including the bypass path.

In all of the embodiments, it is possible in the discharge phase not to connect the capacitor 3 essentially in parallel with the battery, but in series with it, as is indicated by the dashed line in all the figures. This is particularly advantageous where not only high currents but also high voltages are required.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A power supply arrangement comprising:
an input for connecting a voltage source;
a capacitor having an internal resistance;
a means for charging the capacitor, said means for charging the capacitor coupling the capacitor to the input of the power supply arrangement;
means for connecting an electrical load;
a load current regulator, which couples the capacitor to the means for connecting the electrical load;
a feedback path, which couples a means for load current detection, which is coupled to the means for connecting the electrical load, to the load current regulator; and
switching means for coupling the capacitor to the input for connecting the voltage source, such that a parallel circuit of the capacitor with the voltage source is produced in a charging phase of the capacitor, and a series circuit of the capacitor with the voltage source is produced in a discharge phase of the capacitor, wherein the load current regulator comprises an inductive boost converter, wherein the power supply arrangement is configured to be operated in one out of at least a first operating mode, a second operating mode and third operating mode, wherein in the first operating mode, which is a charging mode, the power supply arrangement is configured to charge the capacitor via the means for charging the capacitor, wherein in the second operating mode, which is a discharge mode, the power supply arrangement is configured to discharge the capacitor via the load current regulator, and wherein in the third operating mode, the power supply arrangement is configured to switch on a bypass path, which directly couples the means for charging the capacitor to the means for connecting the electrical load.

2. The power supply arrangement as claimed in claim 1, wherein the internal resistance of the capacitor is less than an internal resistance of the voltage source.

3. The power supply arrangement as claimed in claim 1, wherein the means for connecting an electrical load comprises a means for connecting a light-emitting diode.

4. The power supply arrangement as claimed in claim 1, wherein a light-emitting diode is coupled to the means for connecting an electrical load.

5. The power supply arrangement as claimed claim 1, wherein the internal resistance of the capacitor is less than 100 milliohms.

6. The power supply arrangement as claimed in claim 1, wherein the internal resistance of the is less than 60 milliohms.

7. The power supply arrangement as claimed in claim 1, wherein the capacitor is a supercap.

8. The power supply arrangement as claimed in claim 1, wherein the capacitor has a capacitance in a range from 0.1 to 10 Farad.

9. The power supply arrangement as claimed in claim 1, wherein the capacitor has a capacitance in a range from one to two Farads.

10. The power supply arrangement as claimed in claim 1, wherein the means for load current detection comprises a current source.

11. The power supply arrangement as claimed in claim 1, wherein the means for load current detection comprises a resistor.

12. The power supply arrangement as claimed in claim 1, wherein the load current regulator comprises a means for load current limiting.

13. The power supply arrangement as claimed in claim 1, wherein the load current regulator is a DC/DC converter.

14. The power supply arrangement as claimed in claim 1, wherein the means for charging the capacitor and the load current regulator have a jointly used inductance.

15. The power supply arrangement as claimed in claim 1, wherein the means for charging the capacitor comprises a Buck converter.

16. The power supply arrangement as claimed in claim 1, wherein the bypass path is switchable on and off.

17. The power supply arrangement as claimed in claim 1, wherein the power supply arrangement comprises an integrated circuit.

18. A mobile radio comprising an electrical load in the form of a flash light-emitting diode, a voltage source in the form of a rechargeable battery, and a power supply arrangement as claimed in claim 1 for coupling the electrical load to the voltage source.

19. The power supply arrangement as claimed in claim 1, wherein the means for charging the capacitor comprises a charge pump such that the voltage at the output of the charge pump is greater than the voltage at the input of the charge pump.

* * * * *